US008186377B2

(12) United States Patent
Ishitoya et al.

(10) Patent No.: US 8,186,377 B2
(45) Date of Patent: May 29, 2012

(54) FLUID ON-OFF VALVE DEVICE

(75) Inventors: Tsukuo Ishitoya, Toyota (JP); Nobuo Kobayashi, Toyota (JP); Nobuyuki Ogami, Anjo (JP); Akira Yamashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 481 days.

(21) Appl. No.: 11/887,727

(22) PCT Filed: Apr. 13, 2006

(86) PCT No.: PCT/JP2006/308258
§ 371 (c)(1),
(2), (4) Date: Oct. 2, 2007

(87) PCT Pub. No.: WO2006/112491
PCT Pub. Date: Oct. 26, 2006

(65) Prior Publication Data
US 2009/0267014 A1    Oct. 29, 2009

(30) Foreign Application Priority Data

Apr. 14, 2005  (JP) ................................. 2005-117597

(51) Int. Cl.
*F16K 15/00* (2006.01)
(52) U.S. Cl. ..................... 137/516.29; 137/517; 251/333
(58) Field of Classification Search ............. 137/516.25, 137/516.27, 516.29, 517, 509; 251/333, 251/332
See application file for complete search history.

(56) References Cited

U.S. PATENT DOCUMENTS

| 1,652,038 | A | * | 12/1927 | Meyer | 137/517 |
| 2,960,998 | A | * | 11/1960 | Sinker et al. | 137/542 |
| 3,770,008 | A | * | 11/1973 | Turney | 137/516.25 |
| 4,121,619 | A | * | 10/1978 | Pauliukonis | 137/469 |
| 4,350,176 | A | * | 9/1982 | Lace | 137/242 |
| 4,402,340 | A | * | 9/1983 | Lockwood, Jr. | 137/493.7 |
| 5,551,476 | A | * | 9/1996 | McGinnis | 137/517 |
| 5,785,082 | A | * | 7/1998 | Geis et al. | 137/516.29 |
| 6,343,618 | B1 | * | 2/2002 | Britt et al. | 137/527 |
| 6,708,951 | B2 | * | 3/2004 | Jones et al. | 251/357 |
| 2003/0098074 | A1 | | 5/2003 | Kayahara et al. | |

FOREIGN PATENT DOCUMENTS

GB           1213100 A     11/1970
(Continued)

*Primary Examiner* — Kevin Lee
*Assistant Examiner* — Macade Brown
(74) *Attorney, Agent, or Firm* — Kenyon & Kenyon LLP

(57) ABSTRACT

A check valve (fluid on-off valve device) capable of attaining high sealability in either case where a differential pressure is high or low, comprises a valve body assembly (valve body) contacting and separating from a valve seat portion for communicating and blocking a fluid passage. The valve body assembly comprises a valve body, a low-pressure seal portion constituted out of soft material and a high-pressure seal portion constituted out of harder material than the low-pressure seal portion. In blocking a fluid passage, when a differential pressure between an upstream path and a downstream path in the fluid passage is relatively low, the low-pressure seal portion comes into close contact with a protrusion to block the fluid passage, while when the differential pressure is relatively high, the low-pressure seal portion is compressively deformed by the differential pressure and the high-pressure seal portion comes into close contact with the valve seat body, thus blocking the fluid passage.

10 Claims, 14 Drawing Sheets

FOREIGN PATENT DOCUMENTS

| | | |
|---|---|---|
| JP | S55-31023 U | 2/1980 |
| JP | S58-84459 U | 6/1983 |
| JP | H02-16871 U | 2/1990 |
| JP | H04-49421 | 11/1992 |
| JP | 8-233135 A | 9/1996 |
| JP | 2741426 | 1/1998 |
| JP | 2002-295711 A | 10/2002 |
| JP | 2004-204946 A | 7/2004 |
| JP | 2004-204947 A | 7/2004 |
| WO | WO 00/65256 A1 | 11/2000 |

* cited by examiner

FLUID ON-OFF VALVE DEVICE

This is a 371 national phase application of PCT/JP2006/308258 filed 13 Apr. 2006, claiming priority to Japanese Patent Application No. 2005-117597 filed 14 Apr. 2005, the contents of which are incorporated herein by reference.

BACKGROUND

The present invention relates to a fluid on-off valve device for opening and closing a fluid passage.

As a sealing method for a valve part for high-pressure fluid in high-pressure on-off valve device (a fluid on-off valve device) for opening and closing a high-pressure fluid passage, there has been generally known a method of attaching a seal member formed out of any type of rubber, resin and metal onto a valve body as a movable part and locating the seal member on a valve seat portion to seal fluid, for example, as disclosed in Japanese Patent Laid-Open Publication No. 2002-295711.

SUMMARY

Use of rubber as a seal member provides high sealability and, at the same time, poor pressure resistance. For example, under such a high-pressure condition that a differential pressure between upstream and downstream paths in a fluid passage is higher than 50 MPa, sealing failure may be caused by a squeezing-out phenomenon due to excessive compressive deformation of a seal member.

On the other hand, use of resin and metal as a seal member facilitates to ensure pressure resistance and sealability under such a condition that the differential pressure is high, for example, higher than 50 MPa, while may cause difficult sealing under a relatively low differential pressure, for example, lower than 50 MPa.

In view of the aforementioned problems, it is an object of the present invention to provide a fluid on-off valve device capable of attaining high sealability in either case where a differential pressure between upstream and downstream paths in a fluid passage is high or low.

The fluid on-off valve device according to the present invention includes: a valve seat portion; a valve body which contacts and separates from the valve seat portion to communicate and block a fluid passage and a plurality of seat portions which selectively seal between the valve body and the valve seat portion. The plurality of seal portions have different hardnesses from each other and a differential pressure between upstream and downstream paths in the fluid passage switches a seal portion which seals between the valve body and the valve seat portion to any of the other seal portions having different hardnesses.

Such a configuration permits selective sealing between a valve body and a valve seat portion using a plurality of seal portions having different hardnesses (in other words, elastic modulus, coefficient of elasticity and rigidity) from each other even in either case where a differential pressure between upstream and downstream paths in a fluid passage is in a predetermined high-pressure condition or a predetermined low-pressure condition. The seal portion may be disposed on either one or both of the valve body and the valve seat portion.

In the fluid on-off valve device, a direction in which the valve body contacts and separates from the valve seat portion and a flow direction of the fluid introduced from the upstream path in the fluid passage cross each other, and the plurality of seal portions may be arranged, respectively, in parallel to the orthogonal to the valve body contact/separation direction.

Such a configuration can attain miniaturization of a valve device by reducing the length in the valve body contact/separation direction as compared to a serial layout of a plurality of seal portions in the valve body contact/separation direction. Otherwise, it can increase a stroke in the valve body contact/separation direction if it is of the same size.

In the plurality of seal portions of the fluid on-off valve device, a distance from an end surface in close contact with the valve seat portion to the valve seat portion may become longer as its hardness is higher and the distance may become shorter as its hardness is lower.

In such a configuration, a seal portion having lower hardness contacts with the valve seat portion earlier than a seal portion having higher hardness.

In the fluid on-off valve device, a restoring member giving a restoring force to compressive deformation may be provided for at least a seal portion having the lowest hardness of the plurality of seal portions.

Such a configuration, when a differential pressure between upstream and downstream flows shifts from a predetermined high-pressure condition to a predetermined low-pressure condition, allows an earlier compressively-deformed seal portion having low hardness to be immediately restored to its original shape optimum to a seal in a low-pressure condition, as well as assurance of a seal pressure in a high-pressure condition.

The fluid on-off valve device of the present invention includes a valve seat portion, a valve body which contacts and separates from the valve seat portion to block and communicate between upstream and downstream paths in a fluid passage. The valve body includes a first seal portion sealing between the valve seat portion and the valve body and a second seal portion having higher hardness than the first seal portion. In the fluid on-off valve device, when a differential pressure between the upstream and downstream paths in a fluid passage is lower than a predetermined value, the first seal portion comes into close contact with the valve seat portion to block the fluid passage. On the other hand, when the differential pressure is the predetermined value or higher, the first seal portion in close contact with the valve seat portion is compressively deformed by the differential pressure and the second seal portion comes into close contact with the valve seat portion to block the fluid passage.

Such a configuration permits fluid to be sealed by different seal portions depending upon whether a differential pressure between upstream and downstream paths in a fluid passage is high or low. In other words, when the differential pressure between the upstream and downstream paths in a fluid passage is lower than a predetermined value, a first seal portion having relatively low hardness comes into close contact with a valve seat portion. On the other hand, at the predetermined value or higher, a second seal portion having relatively high hardness comes into contact with the valve seat portion.

Accordingly, proper selection of the material of each seal portion provides high sealability for both cases where the differential pressure is high and low. For example, the first seal portion may use a soft material such as rubber (in other words, elastic modulus, rigidity and hardness are all low), while the second seal portion may use a material harder than the first seal portion (in other words, elastic modulus, rigidity and hardness are all high), such as resin and metal.

In the fluid on-off valve device according to the present invention, part of the valve body may constitute the second seal portion.

Such a configuration constitutes the second seal portion out of the valve body itself, thus restraining the number of parts from increasing.

In the fluid on-off valve device according to the present invention, a direction in which the valve body contacts and separates from the valve seat portion and a flow direction of the fluid introduced from the upstream path in the fluid passage cross each other, and the first seal portion may be disposed on the upstream side of the second seal portion in the flow direction.

Such a configuration locates the first seal portion and the second seal portion on the upstream side (high-pressure side) and downstream side (low-pressure side), respectively. When a differential pressure between upstream and downstream paths shifts from a low-pressure condition (less than the predetermined value) to a high-pressure condition (a predetermined value or higher), the increasing differential pressure allows the first seal portion to be deformed so as to fall down toward the downstream side from the upstream side in a flow direction of fluid, by which sealability is lost and a differential pressure acts on, mainly, the second seal portion. At this time, a differential pressure actually acting on the second seal portion is a differential pressure acting on a ring-shaped region surrounded by the outer periphery of the second seal portion and the outer periphery of the valve body when viewed from the top of the valve body in a differential-pressure working direction.

Accordingly, the above-described configuration permits the ring-shaped region to be relatively widened more than a case where the second seal portion is located more outward (upstream side) in a diametrical direction than the first seal portion. This permits the differential pressure between upstream and downstream paths to be effectively made to effectively work on the second seal portion, thus improving sealability under a high-pressure condition.

In the fluid on-off valve device, a direction in which the valve body contacts and separates from the valve seat portion and a flow direction of the fluid introduced from the upstream path in the fluid passage cross each other, and the first seal portion and the second seal portion may be disposed in parallel to, each other, the orthogonal direction to the direction in which the valve body contacts and separates from the valve seat portion.

Such a configuration can attain miniaturization of a valve device by reducing the length in the valve body contact/separation direction as compared to a serial layout of the first and second seal portions in the valve body contact/separation direction. Otherwise, it can increase a stroke in the valve body contact/separation direction if the valve body is of the same size.

In the fluid on-off valve device, a distance from an end surface in close contact with the valve seat portion of the first seal portion to the valve seat portion may be set so as to be shorter than that from an end surface in close contact with the valve seat portion of the second seal portion to the valve seat portion.

Such a configuration allows the first seal portion having relatively low hardness to contact a valve seat portion earlier than the second seal portion having relatively high hardness.

The fluid on-off valve device according to the present invention may be formed with restoring member for giving a restoring force to the compressively deformed first seal portion.

Such a configuration, when a differential pressure between upstream and downstream flows shifts from a high-pressure condition (a predetermined value or higher) to a low-pressure condition (less than the predetermined value), permits the first seal portion to be immediately restored to its original shape optimum to a seal in a low-pressure condition, as well as assurance of a predetermined or higher seal pressure.

The fluid on-off valve device according to the present invention may be configured so as to constitute the valve seat portion out of a valve seat body and a valve-seat-side seal portion softer than the valve seat body and to make the valve-seat-side seal portion face the first seal portion.

Such a configuration performs sealing by bringing the first seal portion into close contact with the valve-seat-side seal portion. In other words, the first seal portion comes into no direct contact with the valve seat body, which restrains the first seal portion from being worn by the first seal portion sliding against the valve seat body.

Of the plurality of seal portions, the seal portion having relatively low hardness may be constituted out of any of rubber, resin and metal, while the seal portion having relatively high hardness may be constituted out of either of resin or metal.

The first seal portion may be constituted out of any of rubber, resin and metal, while the second seal portion may be constituted out of either of resin or metal.

The fluid on-off valve body according to the present invention may be provided in a fluid passage through which such high pressure gas that a differential pressure between upstream and downstream pressures is a predetermined pressure or higher (for example, 1 MPa or more) flows. In this case, the high-pressure gas may be fuel gas supplied for generation of electric energy or heat energy and further the fuel gas may be hydrogen gas or natural gas (CNG).

The fluid on-off valve body according to the present invention may be any of a check valve, a on-off valve and a relief valve provided in the fluid passage.

BEST MODE FOR CARRYING OUT THE INVENTION

With reference to the accompanying drawings, description will be given below of embodiments according to the present invention.

First Embodiment

Figure 1:
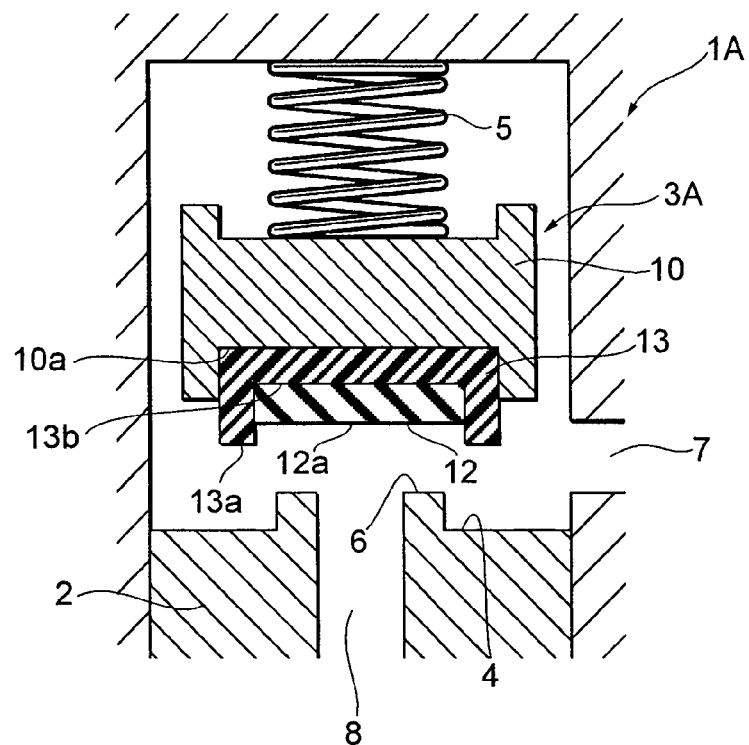
FIG. 1 is a longitudinal sectional view of a check valve according to a first embodiment of the present invention.

FIG. 1 is, for example, a valve provided in a high-pressure fluid passage, and is a check valve (fluid on-off valve device) 1A which permits flowing of fluid in one direction, but prohibits flowing of fluid in any other direction. The check valve 1A is disposed with a valve body assembly (valve element) 3A in fluid passages 7, 8 formed on a valve body 2. The valve body assembly 3A stops flowing fluid into a low-pressure-side fluid passage (downstream passage) 8 on a downstream side in a fluid flowing direction from a high-pressure-side fluid passage (upstream passage) 7 on an upstream side in a fluid flowing direction.

On the low-pressure side of the valve body 2, a valve seat body (valve seat portion) 4 constituting a seal in cooperation with the valve body assembly 3A is formed. In the valve body 2, a spring 5 is provided to give a restoring force in such a direction as to separate from the valve seat body 4 to the valve body assembly 3A. On the central side of the valve seat body 4, there is formed a protrusion portion 9 protruding to the valve body assembly 3A side, surrounding an opening edge of the low-pressure side fluid passage 8. These valve seat body 4 and protrusion portion 6 constitutes a valve seat portion.

The valve body assembly 3A is constituted by fixing a low-pressure seal portion (first seal portion) 12 and a high-pressure seal portion (second seal portion) 13 on a valve body 10 having H-shaped cross section. Each of the seal portions 12, 13 is made of high polymer material, and the low-pressure seal portion 12 is formed out of material softer than the high-pressure seal portion 13, that is, out of material having relatively low hardness. Specifically, as the low-pressure seal portion 12, rubber may be used and, as the high-pressure seal portion 13, resin which has relatively high hardness may be used.

The high-pressure seal portion 13 is fixed so as to be stored in a lower surface of the valve body 10, that is, a recessed portion 10a formed in a surface facing the valve seat body 4, so that a ring-shaped end surface 13a protruding to the valve seat body 4 side comes into contact with the valve seat body 4, thus performing sealing.

The low-pressure seal portion 12 is fixed on the high-pressure seal portion 13 so as to be completely stored in a region surrounded by the end surface 13a of the high-pressure seal portion 13, that is, in the recessed portion 13b formed in the center of the high-pressure seal portion 13. Then, the end surface (surface facing valve seat body 4 side) 12a of the low-pressure seal portion 12 comes into contact with the protrusion portion 6, thus performing sealing.

The end surface 12a of the low-pressure seal portion 12 is positioned more inward of the valve body 10 in the axial direction (valve opening/closing direction and valve contact/separation direction) than the end surface 13a of the high-pressure seal portion 13, while a difference in the height along the valve opening/closing direction between these end surfaces 12a, 13a is set so as to be smaller than a protruding height along the valve opening direction of the protrusion portion 6. Accordingly, besides such a condition that the end surface 12a and the end surface of the protrusion portion 6 in uniform contact with each other, even if the valve body assembly 3A further moves in the valve-closing direction and the low-pressure seal portion 12 is pressed against the protrusion portion 6 for compressive deformation, the end surface 13a of the high-pressure seal portion 13 will come into no contact with the valve seat body 4 as shown in FIG. 2, provided that the deformed amount is at a predetermined level or lower.

In other words, the timing of a contact of the end surface 12a with the protrusion portion 6 is different from that of the end surface 13a with the valve seat body 4. That is, a distance between the end surface 12a of the low-pressure seal portion 12 having relatively low hardness and the protrusion portion 6 is smaller than that between the end surface 13a of the high-pressure seal portion 13 having relatively high hardness and the valve seat body 4.

Next, the operation of the check valve 1A will be described below. In the check valve 1A, when a fluid pressure of the high-pressure fluid passage 7 rises, a load in a valve-closing direction corresponding to a differential pressure between the fluid pressure and a fluid pressure of the low-pressure-side fluid passage 8 and a receiving area of the differential pressure (hereinafter referred to as valve-closing direction load) acts on the valve body 10, and the valve body assembly 3A moves to the valve seat body 4 side against the restoring force of the spring 5.

Figure 2:
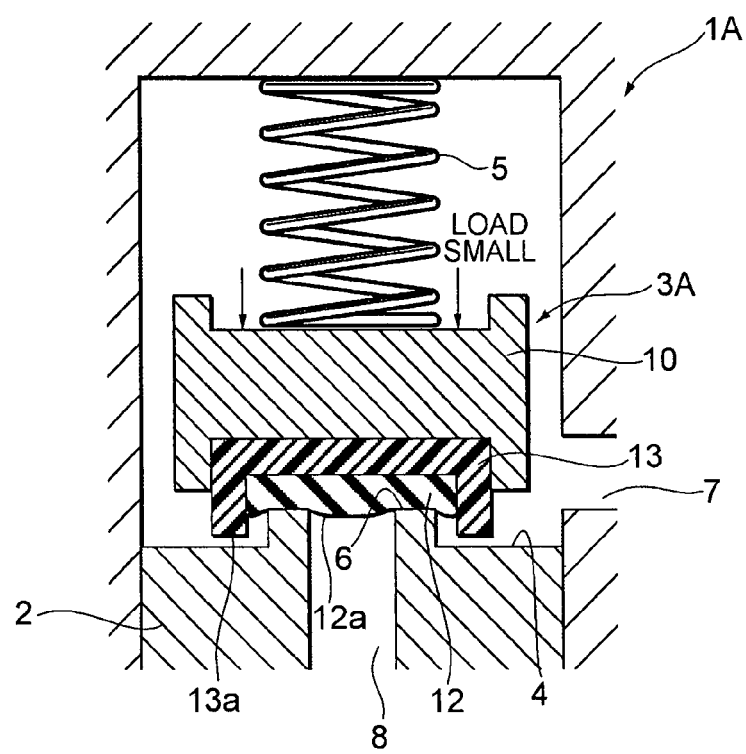
FIG. 2 is a longitudinal sectional view showing a state of the check valve under a low-pressure condition.

FIG. 2 shows a case of a low-pressure condition, that is, a case where a differential pressure between the high-pressure-side fluid passage 7 and the low-pressure-side fluid passage 8 is relatively low. The differential pressure at this time is, for example, 1 MPa (inclusive) to 50 MPa (exclusive). Under this condition, the soft low-pressure seal portion 12 comes into close contact with the protrusion portion 6, thus performing sealing. At this time, no contact is made between the hard high-pressure seal portion 13 and the valve-seat body 4.

Figure 3:
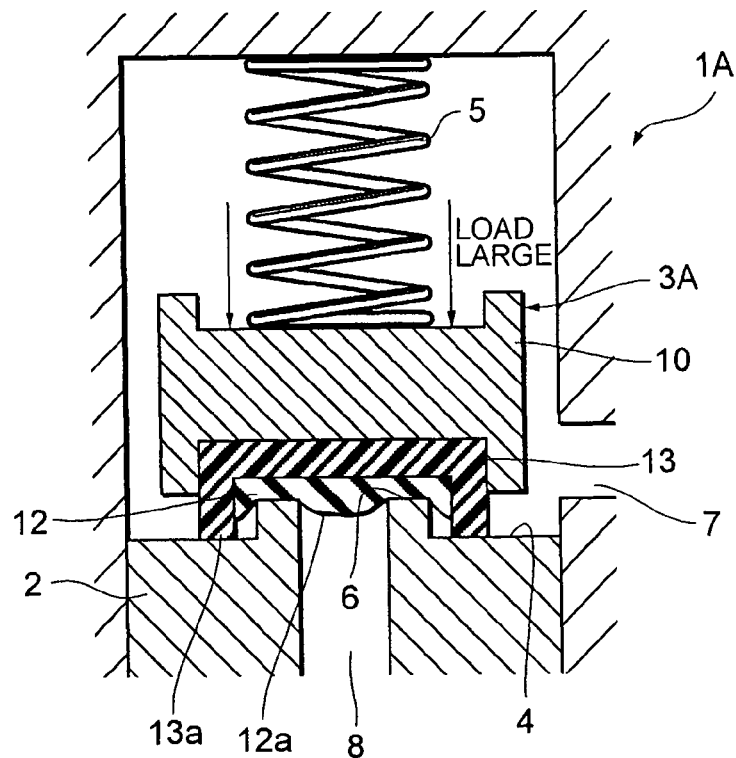
FIG. 3 is a longitudinal sectional view showing a state of the check valve under a high-pressure condition.

FIG. 3 shows a case of a high-pressure condition, that is, a case where a differential pressure between the high-pressure-side fluid passage 7 and the low-pressure-side fluid passage 8 is relatively high. The differential pressure at this time is, for example, at least 50 MPa. Under this condition, a load in the valve-closing direction acting on the valve body assembly 3A increases, so that the low-pressure seal portion 12 is compressively deformed and the valve body assembly 3A is further displaced in the valve-closing direction. Then the hard high-pressure seal portion 13 comes into contact with the valve seat body 4, thus performing sealing.

In this way, the check valve 1A in the present embodiment allows the low-pressure seal portion 12 to come into close contact with the protrusion portion 6 at a low pressure, and the high-pressure seal portion 13 to come into close contact with the valve seat body 4 at a high pressure. Usually, the material of the low-pressure seal portion 12 is deformed for low sealability under a high pressure condition, while the material of the high-pressure seal portion 13 will not provide so high sealability under a low pressure condition. The present embodiment is configured so that sealing is performed by the low-pressure seal portion 12 at a low pressure and by the high-pressure seal portion 13 at a high pressure. This enables high sealability even in either case where a differential pressure between upstream and downstream flows is high or low.

Next, a deformed example of the check valve 1A will be described below. In each of the examples described below, the low-pressure seal portion and the high-pressure seal portion are constituted out of materials having a low and a high hardness and, especially out of high polymer material in the same way as the above-described example, respectively. In the following description, components overlapped with those in the above-described embodiment have the same reference characters and the description thereof are omitted. Furthermore, the overlapped descriptions made on operation and effect are also omitted.

Figure 4:
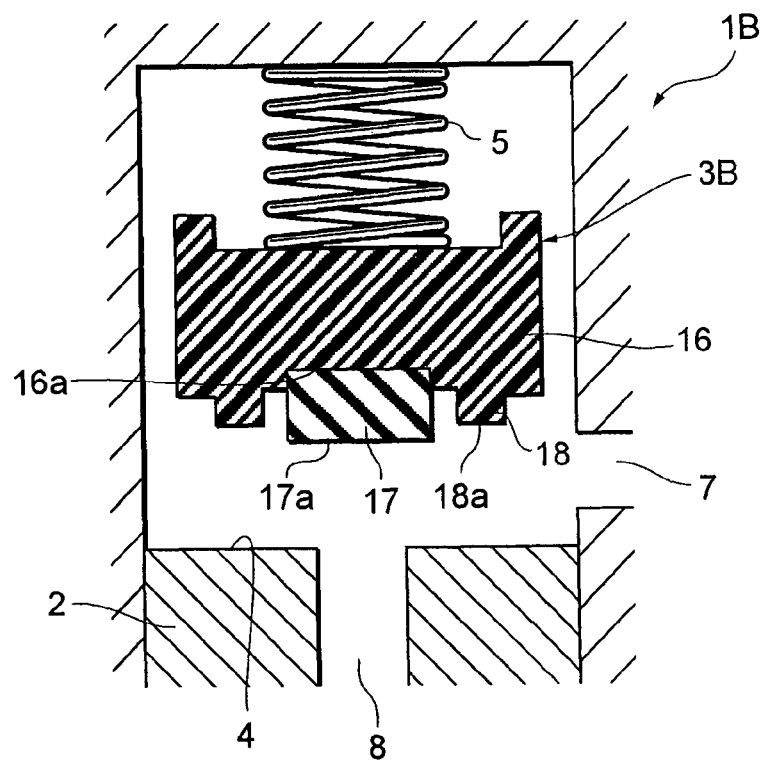
FIG. 4 is a longitudinal sectional view showing a deformed example of the check valve.

A valve body assembly 3B of a check valve 1B shown in FIG. 4 includes a valve body 16 formed out of the same material as that of the high-pressure seal portion 13, for example, hard high polymer material such as polyimide. A soft seal portion 17 such as rubber is fixed so as to be stored in a recessed portion 16a formed in the center of the valve body 16.

The valve body 16 is formed with an annular protrusion 18 facing the valve seat body 4 side and protruding along the valve opening/closing direction on the outside of a recessed portion 16a, and an end surface 18a of the protrusion 18 comes into contact with the valve seat body 4, thus performing sealing. The low-pressure seal portion 17 is fixed at a position surrounded by the protrusion 18, and the end surface 17a comes into contact with the valve seat body 4, thus performing sealing. The end surface 17a is positioned more inward of the valve body 16 in the axial direction (valve opening/closing direction and valve body contact/separation direction) than the end surface 18a.

According to the deformed example, part of the valve body 16, that is, the protrusion 18 comes into contact with the valve seat body 4 in the same way as for the above-described high-pressure seal portion 13, thus performing sealing at a high pressure. This provides the like operation and effect with a smaller amount of parts than in the above-described embodiment.

Figure 5:
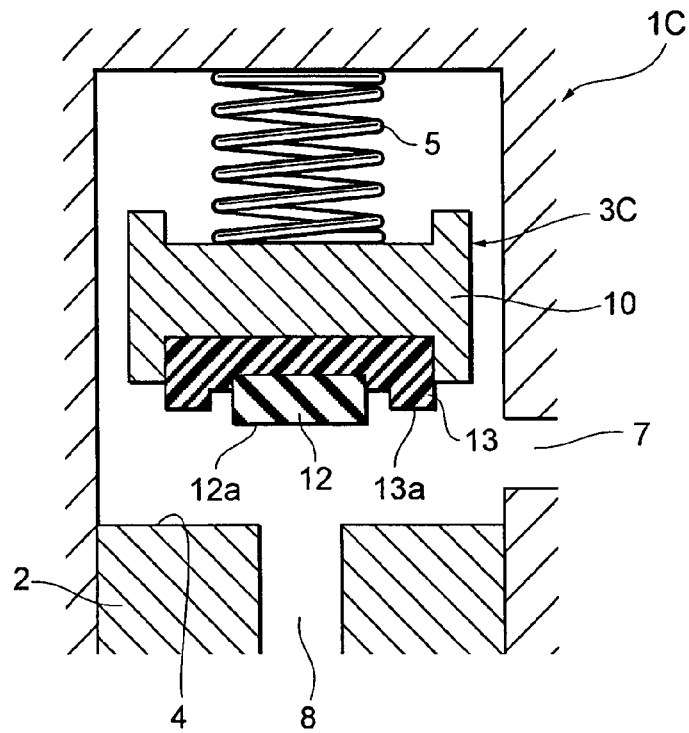
FIG. 5 is a longitudinal sectional view showing a deformed example of the check valve.

As another deformed example, the whole valve seat body 4 may be formed into a flat shape without providing the protrusion portion 6 (refer to FIG. 1) on the valve seat body 4 side, like the check valve 1B shown in FIG. 4 and a check valve 1C shown in FIG. 5. In this case, provision of a step-off or an incline on a seal portion on the valve body side enables adjustment of the timings of contacts of the valve seat body 4 with the low-pressure seal portions 17, 12 and the high-pressure seal portions 18, 13.

For example, in the check valve 1B shown in FIG. 4, no protrusion portion 6 is provided on the valve seat body 4. Accordingly, to compensate for it, the end surface 17a of the low-pressure seal portion 17 in the valve body assembly 3B protrudes to the valve seat body 4 more than the end surface 18a of the protrusion 18 constituting a high-pressure seal portion in a reverse way to the configuration of the check valve 1A in FIG. 1. At valve-closing operation, this permits the protrusion 18 constituting a high-pressure seal portion to perform sealing after sealing is first performed by the low-pressure seal portion 12.

Similarly, in the check valve 1C shown in FIG. 5, no protrusion portion 6 is provided on the valve seat body 4. Accordingly, to compensate for it, the end surface 12a of the low-pressure seal portion 12 in the valve body assembly 3C protrudes to the valve seat body 4 side more than the end surface 13a of the high-pressure seal portion 13 in a reverse way to the configuration of the check valve 1A in FIG. 1. At valve-closing operation, this permits the high-pressure seal portion 13 to perform sealing after sealing is first performed by the low-pressure seal portion 12.

Figure 6:
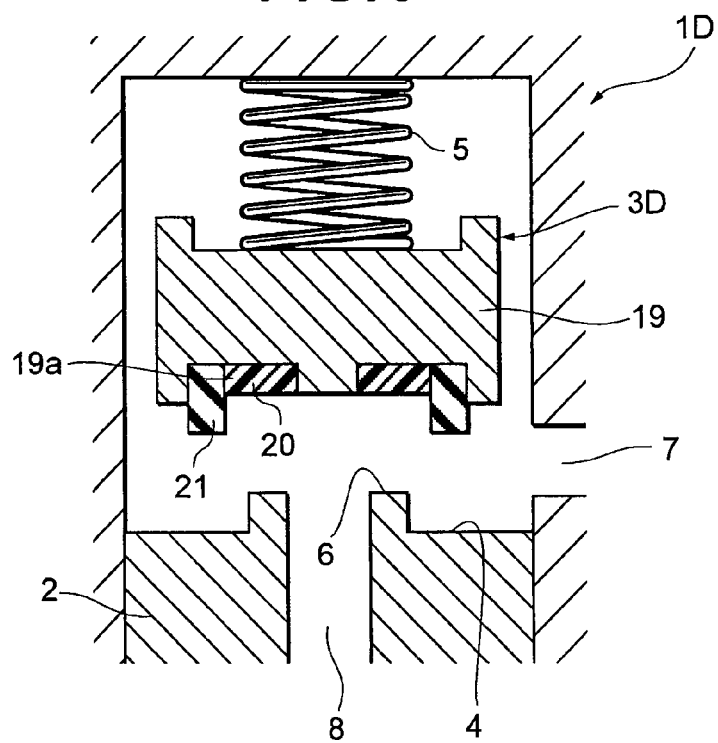
FIG. 6 is a longitudinal sectional view showing a deformed example of the check valve.

As another deformed example of the check valve 1A in FIG. 1, a check valve 1D shown in FIG. 6 may be used. On a valve body assembly 3D of the check valve 1D, a ring-shaped low-pressure seal portion 20 and a high-pressure seal portion 21 positioned on the outside of the low-pressure seal portion 20 in a diametrical direction are fixed so as to be stored in the annular recessed portion 19a provided in the valve body 19. The seal portions 20, 21 are respectively formed out of the same high polymer material as the seal portions 12, 13 and have the like operation and effect.

Figure 7:
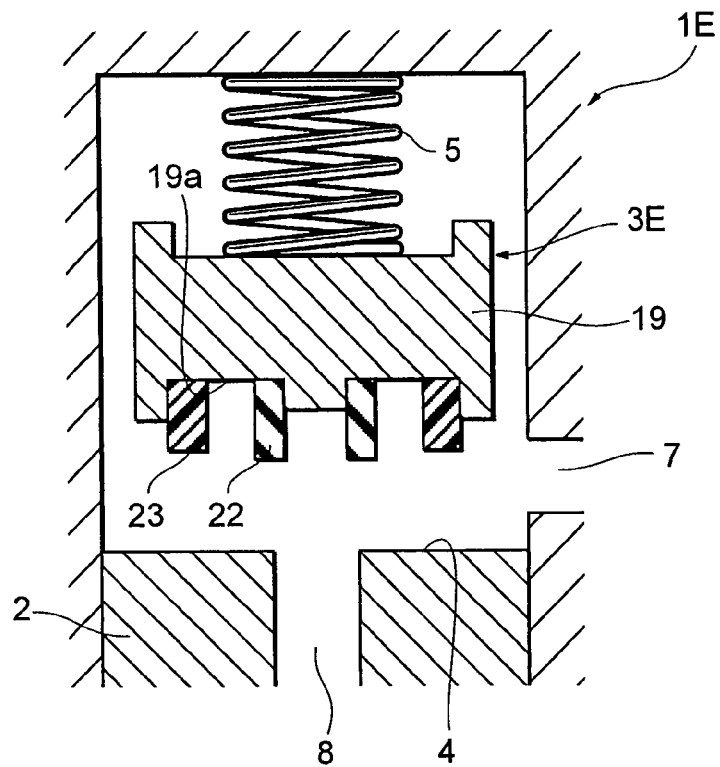
FIG. 7 is a longitudinal sectional view showing a deformed example of the check valve.

As yet another deformed example of the check valve 1A in FIG. 1, a check valve 1E shown in FIG. 7 may be used. The check valve 1E is not formed with such a protrusion 6 that the check valve 1A has. On a valve body assembly 3E, a ring-shaped low-pressure seal portion 22 and the high-pressure seal portion 23 positioned on the outside of the low-pressure seal portion 22 are fixed so as to be stored in the annular recessed portion 19a provided in the valve body 19. Each of the seal portions 22, 23 are of a cylindrical shape.

This deformed example, having ring-shaped seal portions 22, 23 constituted out of the same high polymer material as the seal portions 12, 13, has the like operation and effect.

Second Embodiment

Figure 8:
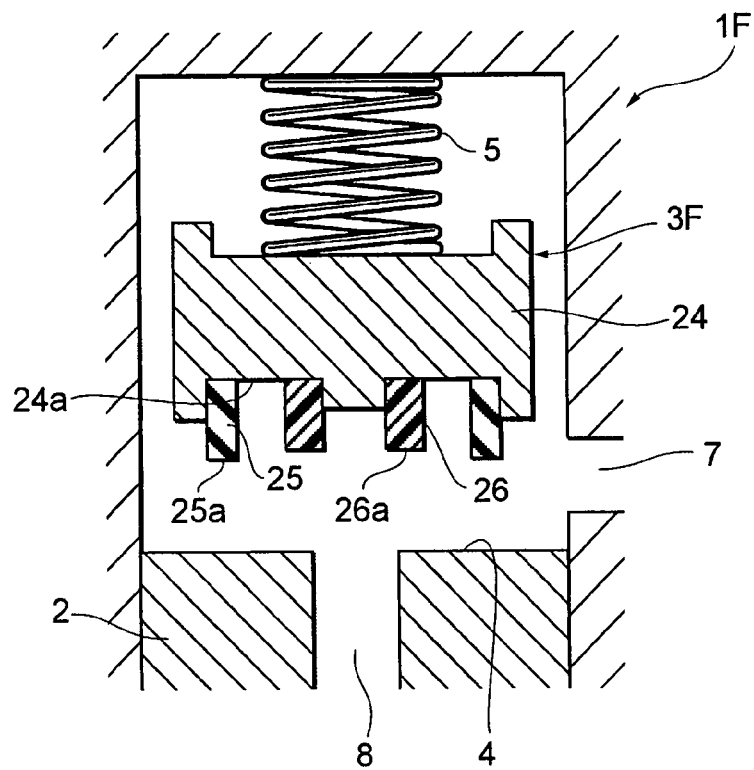
FIG. 8 is a longitudinal sectional view of a check valve according to a second embodiment of the present invention.

FIG. 8 is a view of a check valve 1F according to a second embodiment of the present invention. In the present embodiment, as compared to the check valve 1E in FIG. 7, layouts of the low-pressure seal portion and the high-pressure seal portion have a reverse relationship between the inside and outside in a diametrical direction of the valve body 24 (direction orthogonal to valve opening/closing direction and a flowing direction of fluid introduced from the high-pressure-side fluid passage 7). Specifically, on a valve body assembly 3F of the check valve 1F, a ring-shaped low-pressure seal portion 25 and a high-pressure seal portion 26 positioned on the inside of the low-pressure seal portion 25 in a diametrical direction are fixed so as to be stored in an annular recessed portion 24a provided in the valve body 24.

That is to say, the low-pressure seal portion 25 is disposed upstream of the high-pressure seal portion 26 in a flowing direction of fluid. In other words, a front end portion of the low-pressure seal portion 25 including at least an end surface 25a and a front end portion of the high-pressure seal portion 26 including at least an end surface 26a are laid out in parallel to each other in a direction orthogonal to a valve opening/closing direction of the valve body assembly 3F (valve body contact/separation direction).

Figure 9:
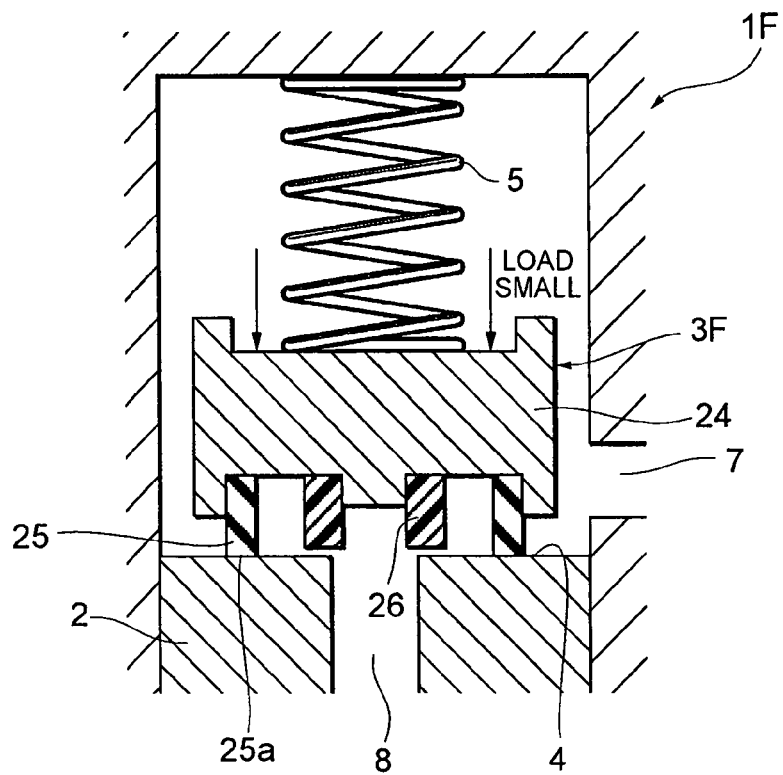
FIG. 9 is a longitudinal sectional view showing a state of the check valve under a low-pressure condition.

In the present embodiment, sealing is performed as follows. Specifically, in such a condition as seen in FIG. 9 showing that a differential pressure between upstream and downstream flows is low (at lower than a predetermined value), the end surface 25a of the low-pressure seal portion 25 comes into contact with the valve seat body 4, thus performing sealing. Under this low-pressure condition, no contact is made between the high-pressure seal portion 26 and the valve seat body 4.

Figure 10:
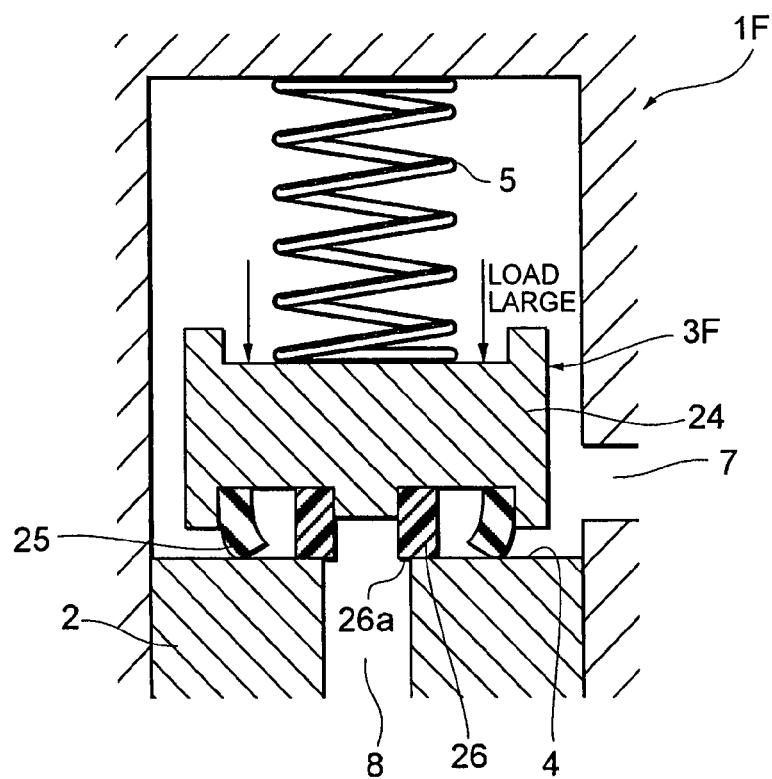
FIG. 10 is a longitudinal sectional view showing a state of the check valve under a high-pressure condition.

On the other hand, under such a condition as seen in FIG. 10 showing that a differential pressure between upstream and downstream flows is high (at a predetermined value or higher), a large valve-closing-direction load further acts on the valve body assembly 3F, so that the low-pressure seal portion 25 attempts to have further compressive deformation due to an increased differential pressure. However, because a high pressure from the high-pressure-side fluid passage 7 acts on the low-pressure seal portion 25, the low-pressure seal portion 25 falls down to the downstream side (the inside in the diametrical direction in FIG. 10). This impairs sealability by the low-pressure seal portion 25, however, the end surface 26a of the high-pressure seal portion 26 comes into close contact with the valve seat body 4 to ensure sealability by the high-pressure seal portion 26.

At this time, a differential pressure actually acting on the high-pressure seal portion 13 is a differential pressure acting on a ring-shaped region surrounded by the outer periphery of the high-pressure seal portion 26 and the outer periphery of the valve body 24 when viewed from the top of the valve body in a differential-pressure working direction (vertical direction in FIG. 10).

In the check valve 1F of the present embodiment, the high-pressure seal portion 26 is positioned inward (downstream side) in a diametrical direction, of the high-pressure seal portion 13 in the check valve 1A shown in FIG. 1, thus relatively widening the ring-shaped region. Accordingly, a differential pressure between upstream and downstream flows can be made to effectively act on the high-pressure seal portion 26, thus improving sealability under a high pressure condition.

Furthermore, as compared to such a configuration that the low-pressure seal portion 25 and the high-pressure seal portion 26 are arranged in series in a contact/separation direction of the valve body assembly 3F, the check valve 1F can be miniaturized by reducing a length in the contact/separation direction, or a stroke in the contact/separation direction can be increased if the check valve 1F is of the same size.

Figure 11:
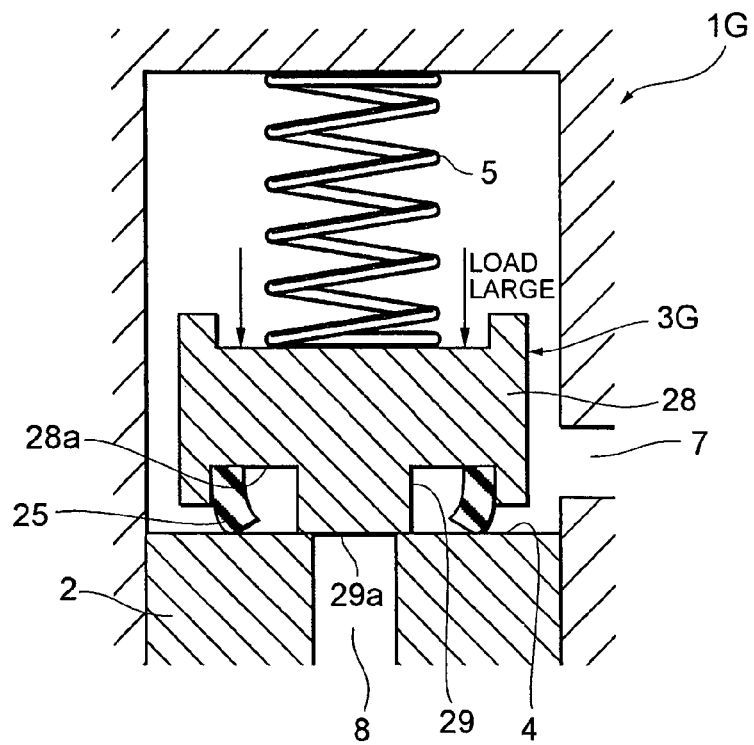
FIG. 11 is a longitudinal sectional view showing a deformed example of the check valve.

As a deformed example of the present embodiment, a check valve 1G formed with a valve body assembly 3G shown in FIG. 11 may be used. In a deformed example shown in FIG. 11, as compared to the check valve 1F, there is not provided the high-pressure seal portion 26 and the valve body assembly 3G is composed of a valve body 28 constituted out of hard high polymer such as polyimide and a soft low-pressure seal portion 25 such as rubber, fixed in an annular recessed portion 28a formed in the valve body 28.

At a central portion of the valve body 28 in the diametrical direction, there is provided a protrusion 29 formed by protruding a central portion (a part) of a surface facing the valve seat body 4 side of the valve body 28 toward valve seat body 4 side (valve opening/closing direction). In this deformed example, the protrusion 29 functions as a high-pressure seal portion and an end surface 29a of the protrusion 29 comes into contact with the seat 4, thus performing sealing at a high pressure.

Figure 12:
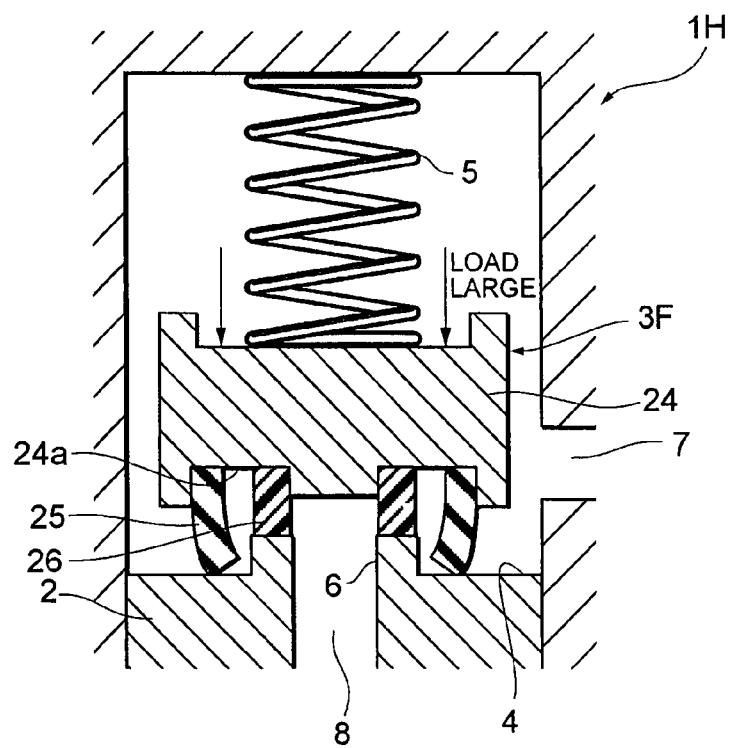
FIG. 12 is a longitudinal sectional view showing a deformed example of the check valve.

As another deformed example, the protrusion portion 6 may be provided on the valve 4 side like a check valve 1H shown in FIG. 12. In this deformed example, the protrusion portion 6 is provided as compared to the check valve 1F.

Accordingly, it is only necessary to adjust contact timing of the soft low-pressure seal portion 25 and the hard high-pressure seal portion 26 by changing heights of the low-pressure seal portion 25 and the high-pressure seal portion 26 as necessary.

Third Embodiment

Figure 13:
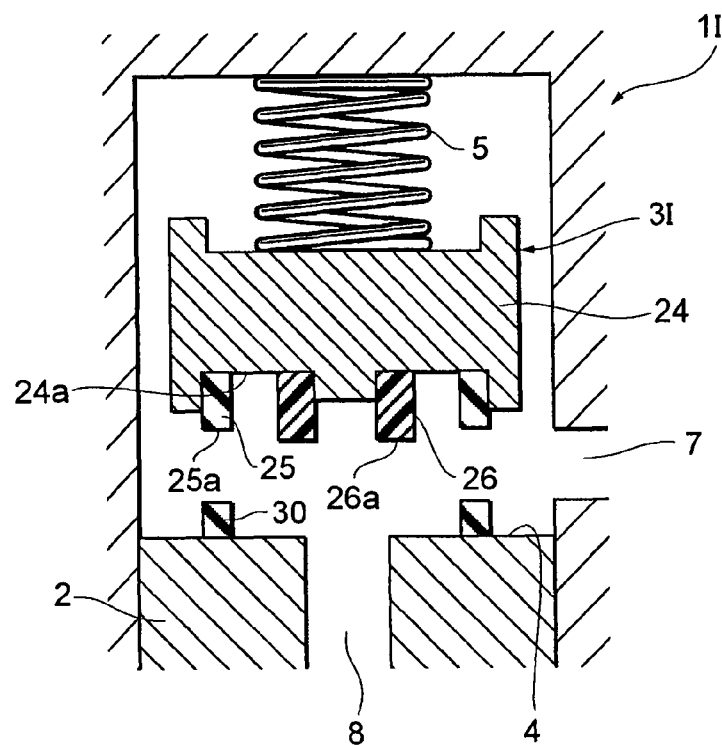
FIG. 13 is a longitudinal sectional view of a check valve according to a third embodiment of the present invention.

FIG. 13 is a view of a check valve 1I according to a third embodiment of the present invention. The check valve 1I is formed with a soft valve-seat-side low-pressure seal portion 30 fixed on the valve seat body 4, and the valve-seat-side low-pressure seal portion 30 constitutes a valve seat portion along with the valve seat body 4. The valve-seat-side low-pressure seal portion 30 may use the same or different type of material as or from the low-pressure seal portion 25, for example, polyimide, if the material is softer than that of the valve seat body 4. The valve-seat-side low-pressure seal portion 30 is of a ring shape and is provided at a position facing the low-pressure seal portion 25.

The valve body assembly 3I has the same configuration, for example, as the valve body assembly 3F shown in FIG. 8, however, heights of the low-pressure seal portion 25 and the high-pressure seal portion 26 are adjusted as necessary so as to appropriately perform sealing at a low pressure and a high pressure as described below.

Figure 14:
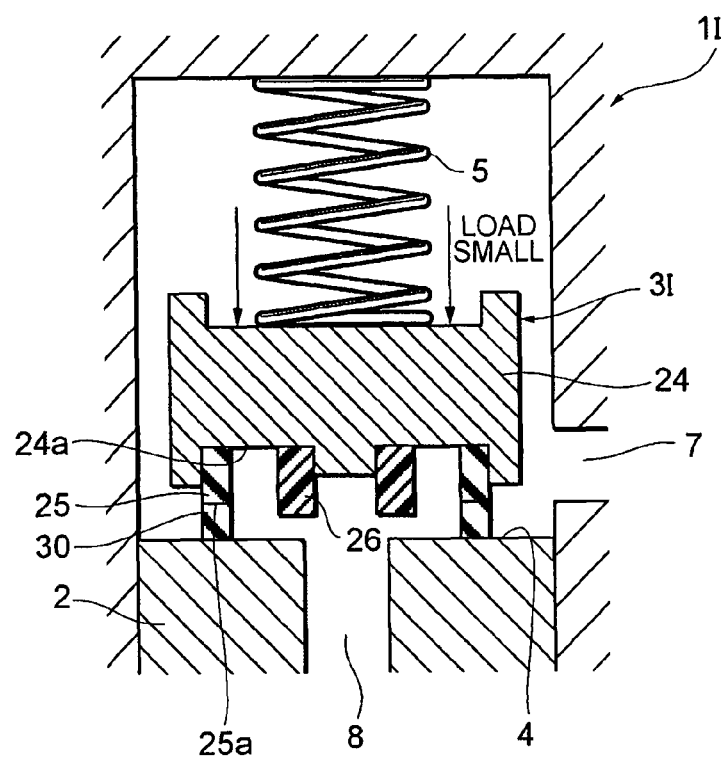
FIG. 14 is a longitudinal sectional view showing a state of the check valve under a low-pressure condition.

In the present embodiment, sealing is performed as follows. Specifically, in such a condition as seen in FIG. 14 showing that a differential pressure between upstream and downstream flows is low (at lower than a predetermined value), the end surface 25a of the low-pressure seal portion 25 comes into contact with the valve-seat-side low-pressure seal 30, thus performing sealing. Under this low-pressure condition, no contact is made between the high-pressure seal portion 26 and the valve seat body 4.

Figure 15:
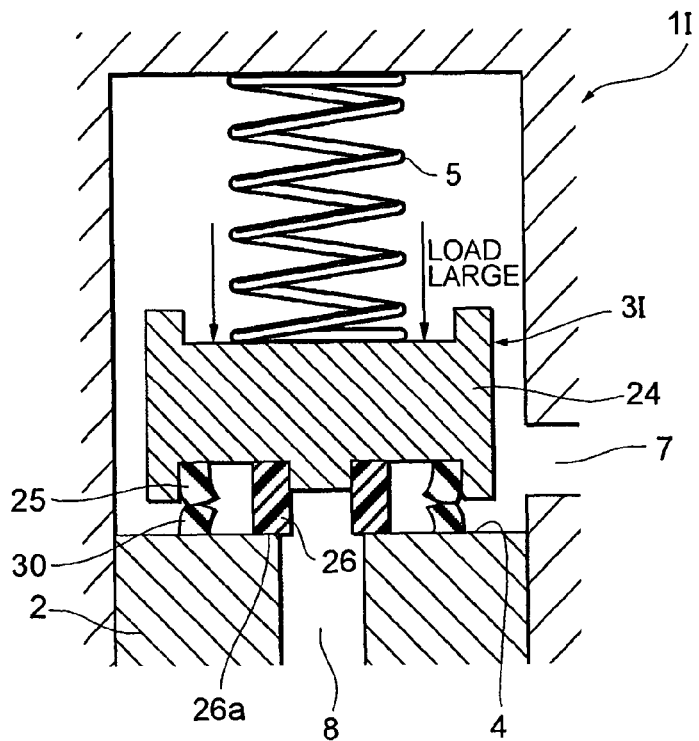
FIG. 15 is a longitudinal sectional view showing a state of the check valve under a high-pressure condition.

On the other hand, under such a condition as seen in FIG. 15 showing that a differential pressure between upstream and downstream flows is high (at a predetermined value or higher), a large valve-closing-direction load further acts on the valve body assembly 3I, so that the low-pressure seal portion 25 and the valve-seat-side low-pressure seal portion 30 attempt to have further compressive deformation due to an increased differential pressure. However, because a high pressure from the high-pressure-side fluid passage 7 acts on the low-pressure seal portion 25 and the valve-seat-side low-pressure seal portion 30, the low-pressure seal portion 25 and valve-seat-side low-pressure seal portion 30 fall down to the downstream side (the inside in the diametrical direction in FIG. 15).

This impairs sealability by the seal portions 25, 30, however, the end surface 26a of the high-pressure seal portion 26 comes into close contact with the valve seat body 4 to ensure sealability by the high-pressure seal portion 26. Then the end surface 26a of the high-pressure seal portion 26 comes into close contact with the valve seat body 4, thus ensuring sealability by the high-pressure seal portion 26.

While the high-pressure seal portion 26 is functioning, each of the low-pressure seal portion 25 and the valve-seat-side low-pressure seal portion 30 bends inward (downstream side) in a diametrical direction to lose a sealing function, so that a differential pressure between upstream and downstream flows can be made to effectively act on the high-pressure seal portion 26 as in the embodiment shown in FIG. 8 and others, thus improving sealability under a high pressure condition.

Furthermore, the present embodiment, formed with the valve-seat-side low pressure seal portion 30, has the following effect: That is to say, if there is no valve-seat-side low-pressure seal portion 30, the low-pressure seal portion 25 slides against the valve seat body 4, which may accelerate wear to the low-pressure seal portion 25. In the present embodiment, on the other hand, the low-pressure seal portion 25 comes into contact only the valve-seat-side low-pressure seal portion 30 without direct contact with the valve seat body 4. This can restrain the low-pressure seal portion 25 from being worn, thus improving durability.

Figure 16:
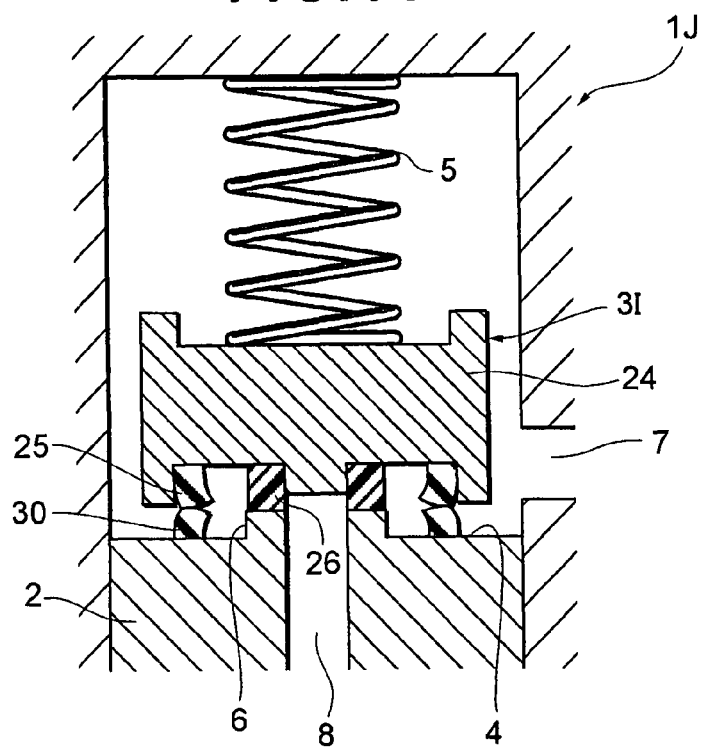
FIG. 16 is a longitudinal sectional view showing a deformed example of the check valve.

As another deformed example of the present embodiment, the protrusion portion 6 may be provided on the valve seat body 4 side like a check valve 1J shown in FIG. 16. In this deformed example, as compared to the check valve 1I in FIG. 13, it is only necessary to adjust contact timing of the low-pressure seal portion 25 and the high-pressure seal portion 26 by changing heights of the low-pressure seal portion 25 and the high-pressure seal portion 26 as necessary.

Figure 17:
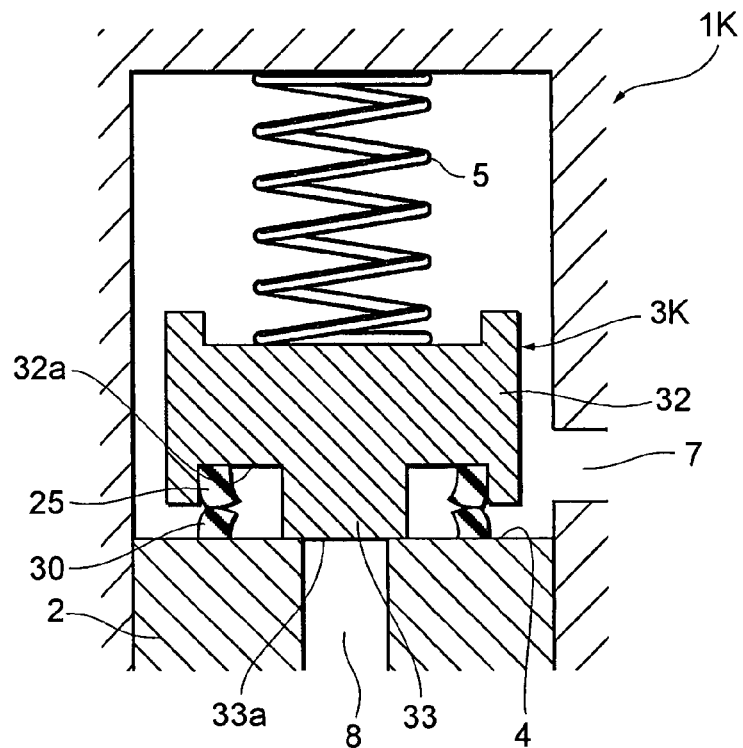
FIG. 17 is a longitudinal sectional view showing a deformed example of the check valve.

As a deformed example of the present embodiment, a check valve 1K formed with a valve body assembly 3K shown in FIG. 17 may be used. In a deformed example of FIG. 17, the high-pressure seal portion 26 (FIG. 16) separate from the valve body assembly 3K is not provided, like the check valve 1G in FIG. 11. The valve body assembly 3K is composed of a valve body 32 constituted of hard high polymer material such as polyimide and a low-pressure seal portion 25, such as rubber, fixed inside an annular recessed portion 32a formed in the valve body 32.

That is to say, at a central portion of the valve body 32 in the diametrical direction, there is provided a protrusion 33 formed by protruding a central portion (a part) of a surface facing the valve seat body 4 of the valve body 32 toward valve seat body 4. In this deformed example, the protrusion 33 functions as a high-pressure seal portion and an end surface 33a of the protrusion 33 comes into contact with the valve seat body 4, thus performing sealing at a high pressure.

Fourth Embodiment

Figure 18:
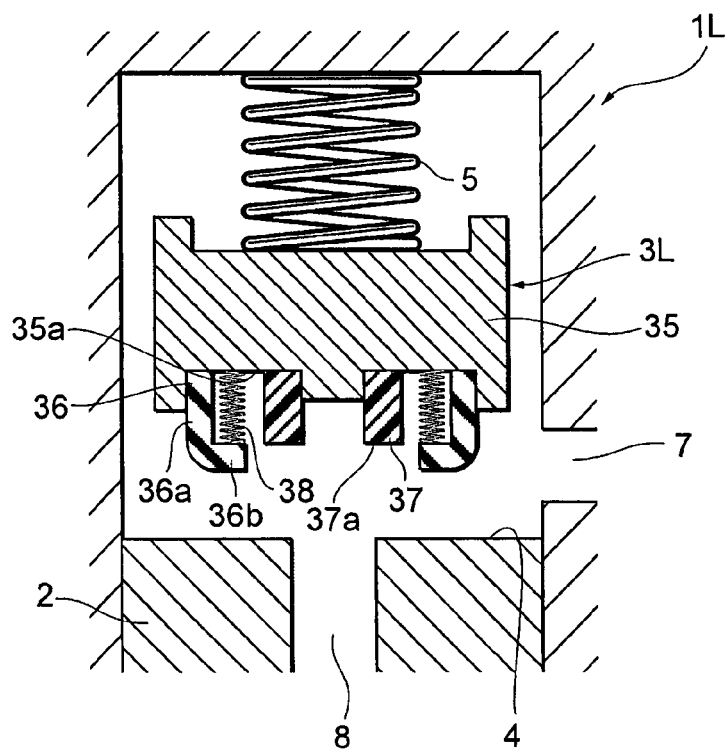
FIG. 18 is a longitudinal sectional view of a check valve according to a fourth embodiment of the present invention.

FIG. 18 is a view of a check valve 1L according to a fourth embodiment of the present invention. A valve body assembly 3L of the check valve 1L is formed by fixing a low-pressure seal portion 36 and a high-pressure seal portion 37 provided on the inside of the low-pressure seal portion 36 in a diametrical direction inside an annular recessed portion 35a provided in a valve body 35. The low-pressure seal portion 36 is formed with a cylindrical portion 36a hung from the recessed portion 35a and a flange portion 36b substantively extending horizontally inward from a lower edge of a cylindrical portion 36a.

Inside the low-pressure seal portion 36, there is provided a coil spring 38 (restoring member) for supporting a flange portion 36b, one end and the other end which are supported on the valve body 35 and the flange portion 36b, respectively. The plurality of coil springs 38 (two shown in FIG. 18) are provided at regular intervals in a peripheral direction of the check valve 1L.

Figure 19:
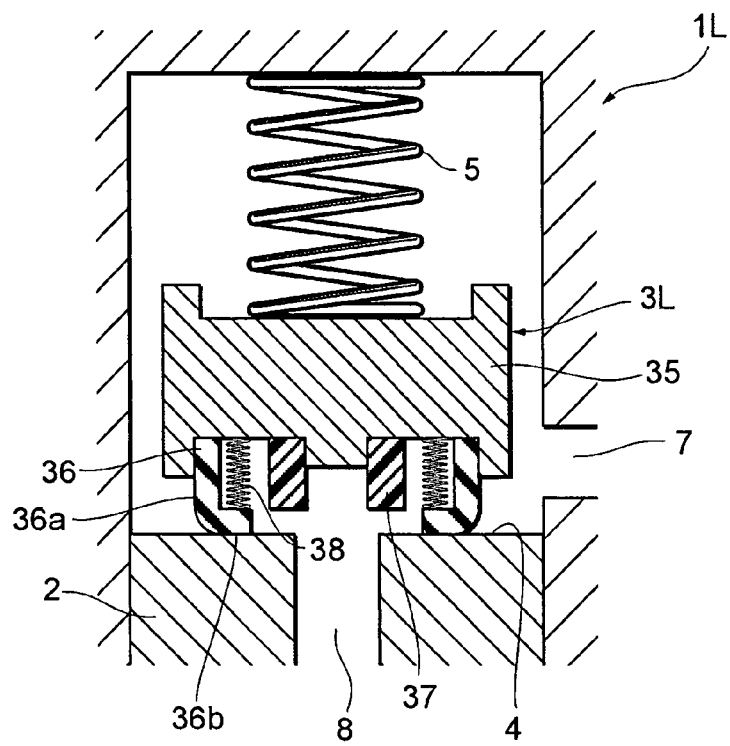
FIG. 19 is a longitudinal sectional view showing a state of the check valve under a low-pressure condition.

In the present embodiment, sealing is performed as follows. In other words, in such a condition as seen in FIG. 19 showing that a differential pressure between upstream and downstream flows is low (at lower than a predetermined value), a lower surface of the flange portion 36b of the low-pressure seal portion 36 comes into contact with the valve seat body 4, thus performing sealing. Under this low-pressure condition, no contact is made between the high-pressure seal portion 37 and the valve seat body 4.

Figure 20:
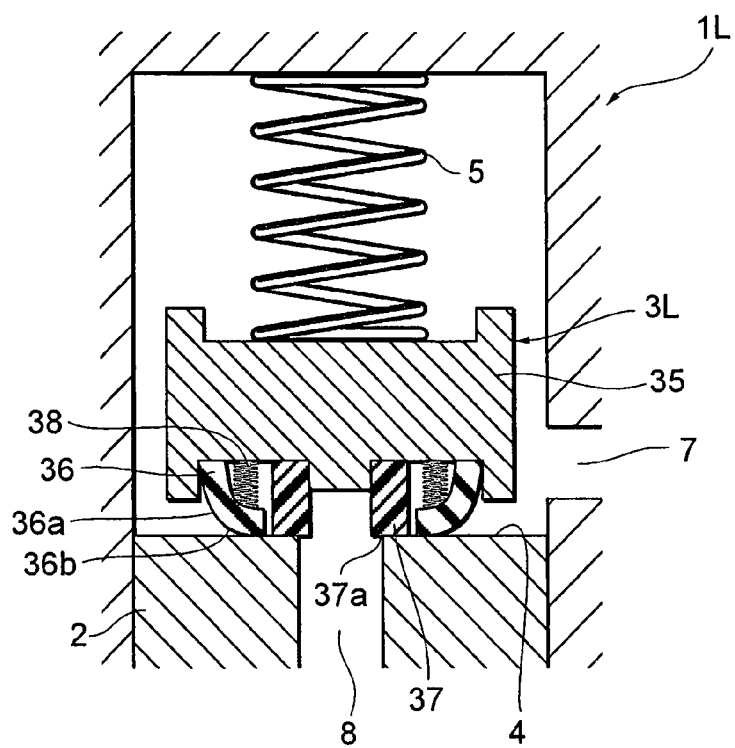
FIG. 20 is a longitudinal sectional view showing a state of the check valve under a high-pressure condition.

On the other hand, under such a condition as seen in FIG. 20 showing that a differential pressure between upstream and downstream flows is high (at a predetermined value or higher), a large valve-closing-direction load further acts on the valve body assembly 3L, so that the low-pressure seal portion 36 attempts to have further deformation due to an increased differential pressure. However, because a high pressure from the high-pressure-side fluid passage 7 acts on the low-pressure seal portion 36, the low-pressure seal portion 36 falls down to the downstream side (the inside in the diametrical direction in FIG. 20). This impairs sealability by the low-pressure seal portion 36, however, the end surface 37a of the high-pressure seal portion 37 comes into close contact with the valve seat body 4 to ensure sealability by the high-pressure seal portion 37.

A differential pressure lowers from a high pressure condition shown in FIG. 20 and, when shifting to a low pressure condition, the low-pressure seal portion 36 rapidly restores to its original condition as shown in FIG. 19 by the repulsion of the coil spring 38. In such a configuration that there is provided no coil spring 38, when a high pressure condition is shifted to a low pressure condition, restoration of the low-pressure seal portion 36 may delay due to a creep phenomenon or sealability under a low pressure condition may degrade due to some wear to the low-pressure seal portion 36 caused by repeating sliding against the valve seat body 4. However, according to the present embodiment, the coil spring 38 permits the low-pressure seal portion 36 to rapidly and positively press the valve seat body 4 at a predetermined pressure or higher for restoration, thus ensuring high sealability.

Figure 21:
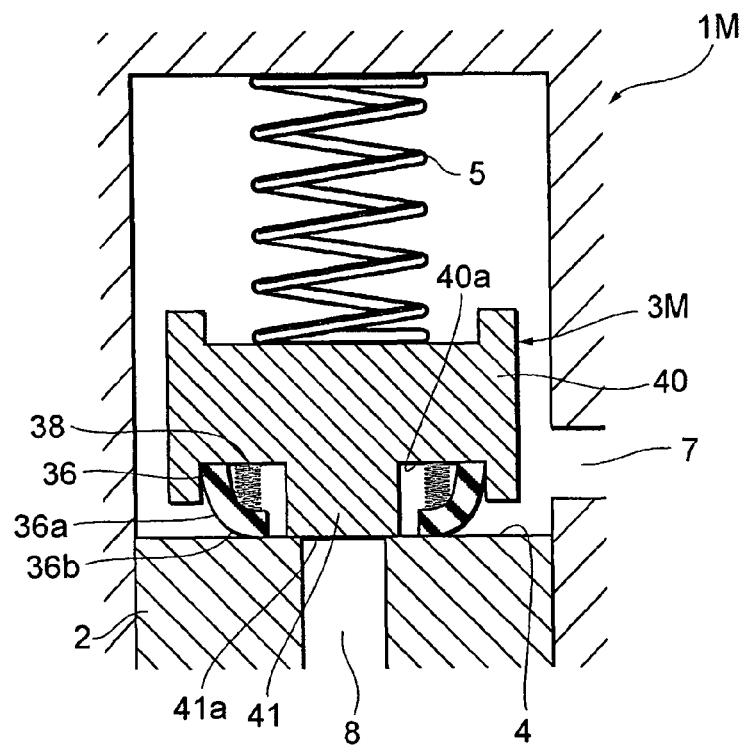
FIG. 21 is a longitudinal sectional view showing a deformed example of the check valve.

As a deformed example of the present embodiment, a check valve 1M shown in FIG. 21 may be used. A valve body assembly 3M of the check valve 1M is composed of a valve body 40 constituted out of hard high polymer material such as polyimide and the low-pressure seal portion 36 and the coil spring 38 fixed inside an annular recessed portion 40a formed in the valve body 40.

At a central portion of the valve body 40 in the diametrical direction, there is provided a protrusion 41 formed by protruding a central portion (a part) of a surface facing the valve seat body 4 of the valve body 40 toward valve seat body 4. In this deformed example, the protrusion 41 functions as a high-pressure seal portion and an end surface 41a of the protrusion 41 comes into contact with the valve seat body 4, thus performing sealing.

Figure 22:
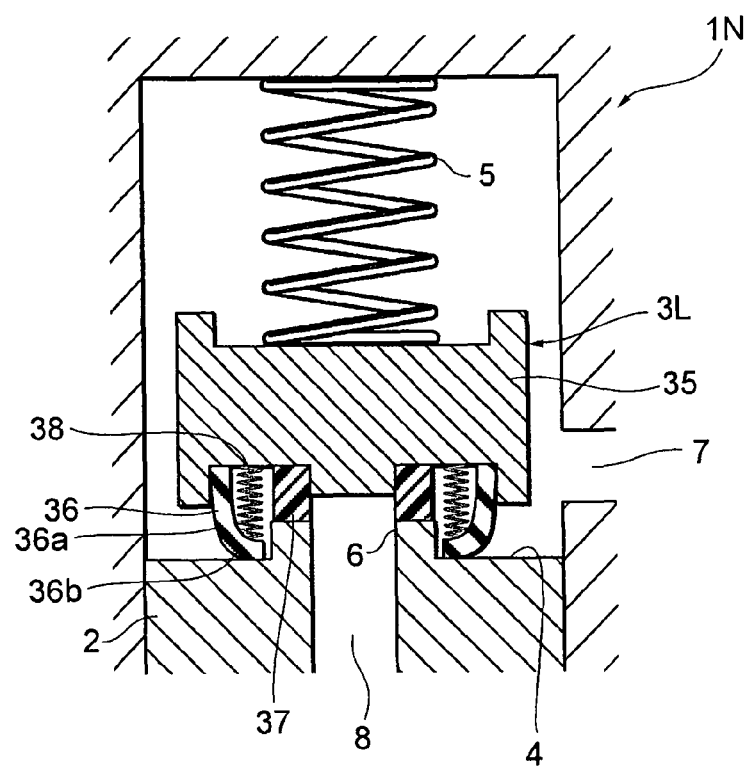
FIG. 22 is a longitudinal sectional view showing a deformed example of the check valve.

As another deformed example of the present embodiment, the protrusion portion 6 may be provided on the valve seat body 4 side like a check valve 1N shown in FIG. 22. In this deformed example, it is only necessary to adjust contact timings of the low-pressure seal portion 36 and the high-pressure seal portions 37 by changing heights of the low-pressure and high-pressure seal portions 36, 37 as necessary.

Figure 23:
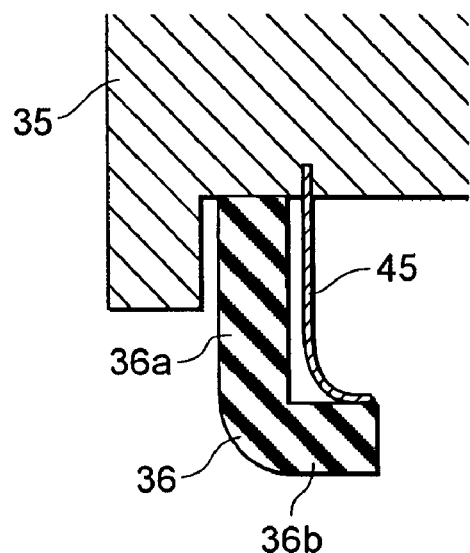
FIG. 23 is a partially sectional view showing a deformed example of a restoring member supporting a low-pressure seal portion.
Figure 24:
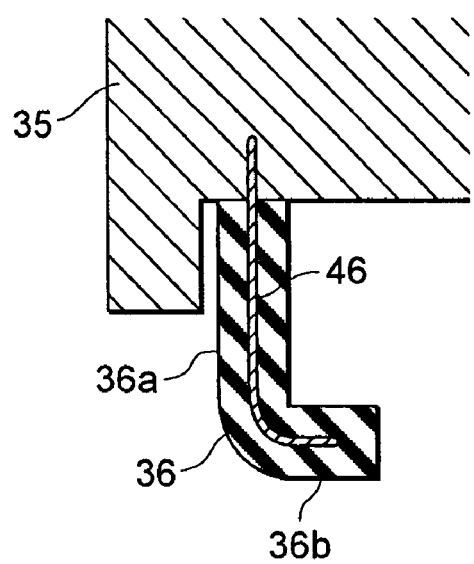
FIG. 24 is a partially sectional view showing a deformed example of a restoring member supporting a low-pressure seal portion.
Figure 25:
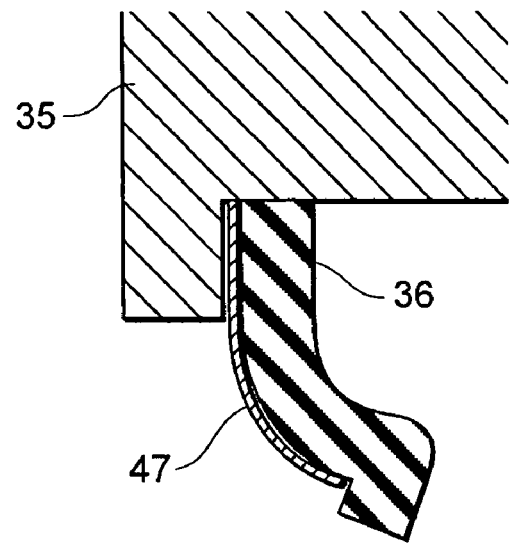
FIG. 25 is a partially sectional view showing a deformed example of a restoring member supporting a low-pressure seal portion.

In the present embodiment and the respective deformed examples thereof, the following deformed example can be applied in place of the coil spring 38. For example, FIGS. 23-25 show deformed examples using a leaf spring 45. In FIG. 23, the leaf spring 45 is provided inside the low-pressure seal portion 36 in a diametrical direction, base end of which is inserted into the valve body 35 and front end elastically supports the flange portion 36b.

FIG. 24 is a view showing a deformed example using the leaf spring 46 inserted into the low-pressure seal portion 36. The leaf spring 46, base end of which is inserted into the valve body 35, is inserted into a cylindrical portion 36a and the flange portion 36b, which permits the whole low-pressure seal portion 36 to be elastically supported.

FIG. 25 is a view showing a deformed example using the leaf spring 47 inserted in the low-pressure seal portion 36.

The base end of the leaf spring 47 is fixed, sandwiched between the valve body 35 and the low-pressure seal portion 36, and the front end thereof is fixed with the low-pressure seal portion 36.

In the deformed examples of leaf springs 45, 46, 47 shown in FIGS. 23-25, a restoring force can be given so that the low-pressure seal portion 36 may be rapidly restored from an inward compressively-deformed condition to its original condition, in the same way as for the coil spring 38.

Figure 26:
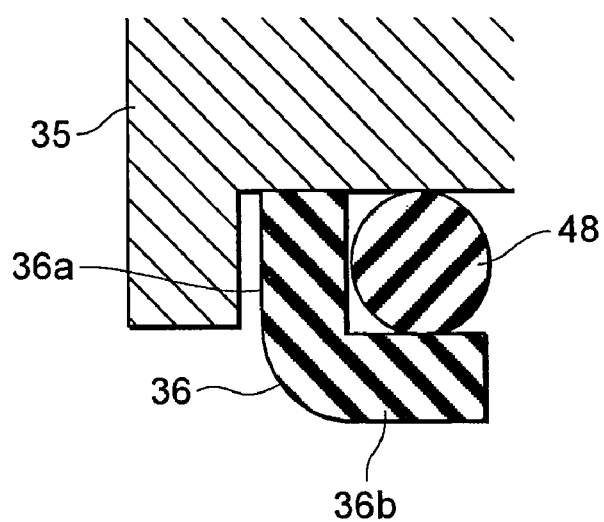
FIG. 26 is a partially sectional view showing a deformed example of a restoring member supporting a low-pressure seal portion.

FIG. 26 is a view showing a deformed example using rubber 48 provided on the inside of the low-pressure seal portion 36. The rubber 48, of a ring shape, is provided around the axis of the valve body 35 and circular in cross section. The rubber may be rectangular in cross section like the rubber 49 of another deformed example shown in FIG. 27.

Figure 27:
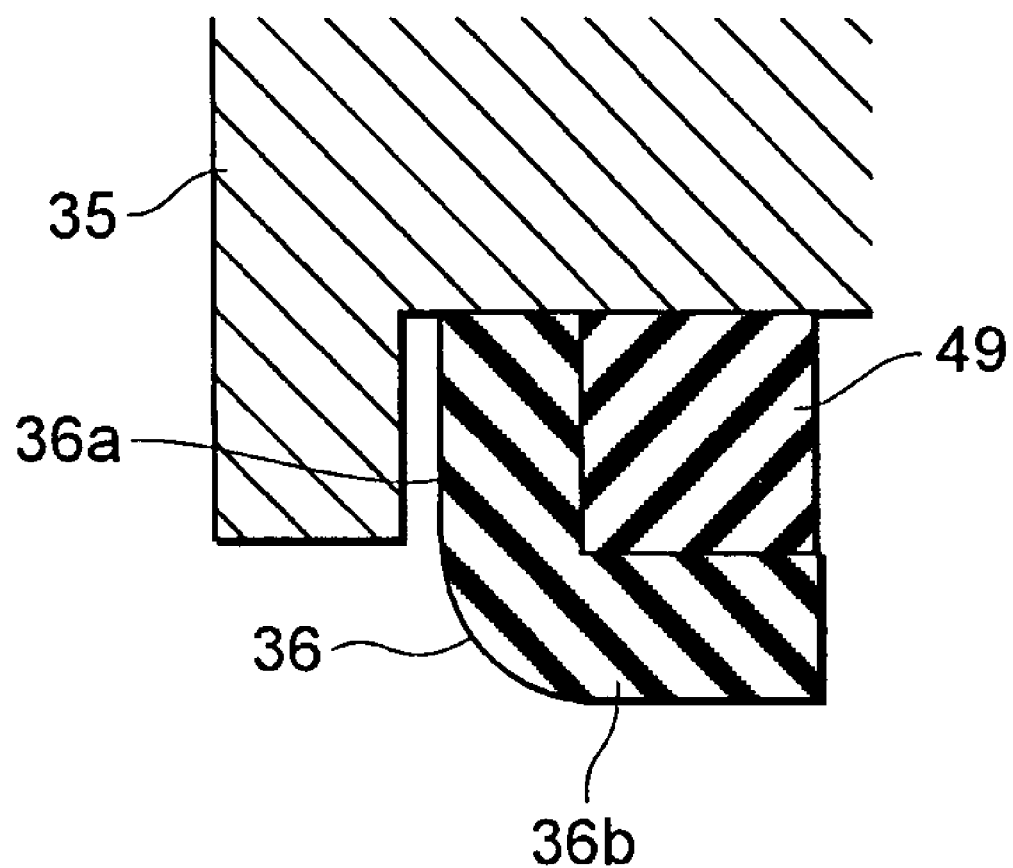
FIG. 27 is a partially sectional view showing a deformed example of a restoring member supporting a low-pressure seal portion.

Regarding rubbers 48, 49 shown in FIGS. 26 and 27 as well, a restoring force may be given to the low-pressure seal portion 36 so as to rapidly restore it from an inward compressively-deformed condition to its original condition by means of an elastic force owned by the material itself.

As a restoring member for giving a restoring force to the low-pressure seal portion 36 in this way, any elastic body may be used.

Other Embodiments

In any check valve described above, the spring 5 is not always required. Some examples where the present invention is applied to the check valves are described above, however, a main stop valve or a regulating valve may be used if it is a type of fluid on-off valve device.

In a system which supplies high-pressure fluid (high-pressure gas) to a fluid consuming apparatus (fuel consuming apparatus) such as a fuel cell for generating power by an electrochemical reaction of fuel gas and oxygen gas and an internal combustion engine for a fuel cell powered vehicle which drives a running motor with generated electric power (electric energy) of the fuel cell and a natural gas powered vehicle which obtains driving power for running by means of heat energy obtained by burning natural gas (CNG) with an internal combustion engine, for example, a main stop valve (root valve) or a on-off valve for controlling the presence of fuel gas supply from a fuel gas supply source to a fuel gas consuming apparatus, one or a plurality of check valves for preventing counter-flow of fuel gas in a fuel gas flow path, one or a plurality of excessive flow prevention valves for preventing abnormal rise in fuel gas flow rate in a fuel gas flow path, one or a plurality of relief valves for preventing abnormal rise in fuel gas pressure in a fuel gas flow path, or one or a plurality of regulating valves for regulating (pressure reduction) fuel gas supply pressure from a fuel gas supply source to a fuel gas consuming apparatus to a predetermined pressure, are provided in a fluid passage (fuel gas flow passage) between the inside of a fuel gas supply source such as a fuel gas tank or the fuel gas supply source and the fuel gas consuming apparatus, and the present invention can be applied to these valves as well.

It has been described above that the materials of the low-pressure seal portion and the high-pressure seal portion use soft and hard high polymer respectively, but the material to be used is not limited to it. The low-pressure seal portion may use synthetic rubber such as polybutadiene group, butadiene-acrylonitrile group or chloroprene group as well as natural rubber. On the other hand, the high-pressure seal portion may use thermoplastic resin such as polyethylene (PE), polypropylene (PP), polyvinylchloride (PVC) or polystyrene (PS), or thermosetting resin such as phenol resin (PF), epoxy resin (EP) or alkyd resin as well as metals.

The respective seal portions may be disposed on either one or both of the valve body and the valve seat portion.

INDUSTRIAL APPLICABILITY

The present invention permits selective sealing between a valve body and a valve seat portion using a plurality of seal portions having different hardnesses from each other even in either case where a differential pressure between upstream and downstream paths in a fluid passage is in a predetermined high-pressure state or a predetermined low-pressure state. Moreover, according to the present invention, when a differential pressure between upstream and downstream paths in a fluid passage is lower than a predetermined value (at a low pressure), a first seal portion comes into close contact with a valve seat portion and when the differential pressure is a predetermined value or higher (at a high pressure), a second seal portion comes into close contact with the valve seat portion, by which appropriate selection of the material of each seal portion ensures high sealability in either case where a differential pressure between upstream and downstream flows is high or low.

Accordingly, the present invention can be widely used in a variety of applications to fluid on-off valve devices having their requirements.

We claim:

1. A fluid switching valve device comprising:
a valve seat portion including a protrusion portion;
a valve body contacting and separating from the valve seat portion to communicate and block between upstream and downstream paths in a fluid passage during normal operation of the valve device, wherein:
the valve body includes a first seal portion sealing between the valve seat portion and the valve body and a second seal portion having higher hardness than the first seal portion;
a direction in which the valve body contacts and separates from the valve seat portion and a flow direction of the fluid introduced from the upstream path in the fluid passage cross each other during the normal operation of the valve device;
the first seal portion and the second seal portion are arranged parallel to each Other and disposed in a direction orthogonal to the valve body contact/separation direction; and
in blocking the fluid passage by a differential pressure between upstream and downstream paths in the fluid passage, when the differential pressure is less than a predetermined value, the first seal portion is allowed to come into close contact with the protrusion portion of the valve seat portion for blocking of the fluid passage and, on the other hand, when the differential pressure is the predetermined value or higher, the first seal portion in close contact with the protrusion portion of the valve seat portion is allowed to be compressively deformed by the differential pressure and the second seal portion is allowed to come into close contact with the valve seat portion for blocking of the fluid passage,
wherein the fluid flows in the flow direction and is prohibited from flowing in any other direction,
wherein the first seal portion is disposed only inwardly from the second seal portion, and
wherein both the first and second seal portions contact the valve seat portion at flat, non-tapered surfaces.

2. The fluid switching valve device according to claim 1, wherein:
part of the valve body constitutes the second seal portion.

3. The fluid switching valve device according to claim 1, wherein:
a distance from an end surface in close contact with the valve seat portion of the first seal portion to the valve seat portion is set shorter than that from an end surface in close contact with the valve seat portion of the second seal portion to the valve seat portion.

4. The fluid switching valve device according to claim 1, said device including restoring means giving a restoring force to the compressively-deformed first seal portion.

5. The fluid switching valve device according to claim 1, wherein:
the valve seat portion includes a valve seat body and a valve-seat-side seal portion softer than the valve seat body and the valve-seat-side seal portion is disposed at a position facing the first seal portion.

6. The fluid switching valve device according to claim 1, wherein:
the first seal portion is constituted out of any of rubber, resin and metal, while the second seal portion is constituted out of either of resin or metal.

7. The fluid switching valve device according to claim 1:
said device being provided in a fluid passage through which high-pressure gas having a differential pressure between upstream and downstream pressures kept under a predetermined pressure or higher passes.

8. The fluid switching valve device according to claim 7, wherein:
the high-pressure gas is fuel gas supplied for generation of electric energy or heat energy.

9. The fluid switching valve device according to claim 8, wherein:
the fuel gas is hydrogen gas or natural gas.

10. The fluid switching valve device according to claim 7, wherein:
any of a check valve, a on-off valve and a relief valve is provided in the flow passage.

* * * * *